United States Patent [19]
Fortenberry

[11] Patent Number: 6,088,088
[45] Date of Patent: Jul. 11, 2000

[54] CHROMATIC DISPERSION MEASUREMENT SCHEME HAVING HIGH FREQUENCY RESOLUTION

[75] Inventor: Rance M. Fortenberry, Santa Rosa, Calif.

[73] Assignee: Hewlett-Packard Company, Palo Alto, Calif.

[21] Appl. No.: 09/283,372

[22] Filed: Mar. 31, 1999

[51] Int. Cl.[7] .................................................. G01B 9/02
[52] U.S. Cl. ......................................... 356/73.1; 356/345
[58] Field of Search .................................... 356/345, 346, 356/73.1, 349

[56] References Cited

U.S. PATENT DOCUMENTS

| | | | |
|---|---|---|---|
| 4,556,314 | 12/1985 | Stone | 356/73.1 |
| 5,406,368 | 4/1995 | Horiuchi et al. | 356/73.1 |

OTHER PUBLICATIONS

"Fiber Optic Test and Measurement", Chapter 12, Edited by Dennis Derickson, Prentice Hall PTR, 1998, ISBN 0–13–534330–5; Sec. 12.3, "Measuremnt of Chromatic Dispersion" pp. 479–485.

Leonard G. Cohen, "Comparison of Single–Mode Fiber Dispersion Measurement Techniques", Journal of Lightwave Technology, vol. LT–3, No. 5, Oct. 1985; pp. 958–966.

*Primary Examiner*—Robert H. Kim
*Attorney, Agent, or Firm*—John L. Imperato

[57] ABSTRACT

A measurement scheme measures dispersive characteristics of optical components. The scheme includes modulation phase shift measurements performed on modulated optical carriers where the carrier frequency and the modulation frequency of the modulated optical carriers are adjusted to maintain a reference modulation sideband. A reference phase term is established by the reference modulation sideband in each of the modulation phase shift measurements. Phase indices of refraction at discrete optical frequencies of non-reference modulation sidebands are extracted from the modulation phase shift measurements. The extracted phase indices are used to calculate relative group delay and chromatic dispersion as measures of dispersive characteristics of the optical component. High timing resolution and high frequency resolution are achieved simultaneously through independent adjustment of the carrier frequency and the modulation frequency enabling optical components, including those having dispersive characteristics that are highly dependent on optical frequency, to be accurately characterized.

20 Claims, 3 Drawing Sheets

CHROMATIC DISPERSION MEASUREMENT SCHEME HAVING HIGH FREQUENCY RESOLUTION

BACKGROUND OF THE INVENTION

Chromatic dispersion causes frequency-dependent group delay variations that limit data rates and corrupt transmission of optical signals within optical communication systems. As data rates of optical communication systems increase through techniques such as dense wavelength division multiplexing, chromatic dispersion measurements of optical components within the systems become increasingly important indicators of the systems' performance.

Optical components, such as optical fibers, have dispersive characteristics that vary slowly as a function of optical frequency. These components can be measured accurately using the modulation phase shift method described in Chapter 12 of "Fiber Optic Test and Measurement", edited by Dennis Derickson, Prentice Hall PTR, 1998, ISBN 0-13-534330-5. However, other types of optical components, such as fiber Bragg gratings, have dispersive characteristics that vary quickly as a function of optical frequency. Accurately measuring these components is difficult due to an inherent compromise between frequency resolution and timing resolution associated with the modulation phase shift method.

The modulation phase shift method phase compares an amplitude modulated optical carrier with a phase reference signal. The phase comparison, performed at various optical carrier frequencies, indicates frequency-dependent group delay variations within an optical component and provides the basis for chromatic dispersion measurements. However, frequency resolution is limited in the modulation phase shift method because the measured group delay is a function of the delays at the frequencies of upper and lower modulation sidebands resulting from the amplitude modulation of the optical carrier. Because the modulation sidebands are necessarily spaced far apart in frequency to achieve sufficiently high timing resolution, frequency resolution is sacrificed. Group delay variations that are near or within the frequency spacing of the modulation sidebands are smoothed out and the dispersive characteristics of the optical component are masked by the modulation phase shift method.

Frequency resolution can be increased by decreasing the modulation frequency of the modulated optical carrier. While this reduces the smoothing effect on the measured group delay, decreasing the modulation frequency decreases the timing resolution of the group delay measurement, which decreases the accuracy of the chromatic dispersion measurement. Accordingly, there is a need for a measurement scheme that achieves high frequency resolution without correspondingly decreasing timing resolution, so that the dispersive characteristics of various types of optical components can be accurately characterized.

SUMMARY OF THE INVENTION

A measurement scheme constructed according to the preferred embodiments of the present invention accurately measures dispersive characteristics of optical components, achieving high frequency resolution without sacrificing timing resolution. The scheme includes modulation phase shift measurements performed on two or more modulated optical carriers where the carrier frequency and the modulation frequency of the modulated optical carriers are adjusted to maintain a reference modulation sideband. A reference phase term in each of the modulation phase shift measurements is established by the reference modulation sideband. Phase terms and phase indices of refraction at discrete optical frequencies of the non-reference modulation sidebands are extracted from the modulation phase shift measurements and the reference phase term. The phase terms indicate changes in group delay at the discrete optical frequencies. The phase indices are used to calculate relative group delay and chromatic dispersion, providing measures of the dispersive characteristics of the optical component.

According to a first preferred embodiment of the present invention, reference modulation sidebands of the modulated optical carriers are alternatively designated. In a first alternative the reference modulation sideband is designated to be a lower modulation sideband of each of the modulated optical carriers. The reference modulation sideband in a second alternative is designated to be an upper modulation sideband of each of the modulated optical carriers. In a third alternative the reference modulation sidebands are designated to be an upper modulation sideband of a first modulated optical carrier and a lower modulation sideband of a second modulated optical carrier, where the lower modulation sideband and the upper modulation sideband are coincident in frequency. In each alternative designation of reference modulation sidebands, the number of modulated optical carriers is expandable to form a series of modulated optical carriers. This enables phase terms and phase indices to be extracted at a series of discrete frequencies within a frequency segment defined by a minimum and maximum modulation frequency. According to a second preferred embodiment of the present invention, an arrangement of modulated optical carriers spans multiple frequency segments, enabling phase terms and phase indices to be extracted over a frequency range broader than that defined by the minimum and maximum modulation frequency.

Timing resolution of the measurement scheme is established by the modulation frequency of the modulated optical carriers whereas frequency resolution depends on the frequency spacing between optical carriers. High timing resolution and high frequency resolution are achieved simultaneously through independent adjustment of the carrier frequency and the modulation frequency of the modulated optical carriers. This enables optical components, including those having dispersive characteristics that are highly dependent on optical frequency, to be accurately characterized using the measurement scheme.

DETAILED DESCRIPTION OF THE PREFERRED EMBODIMENT

Figure 1:
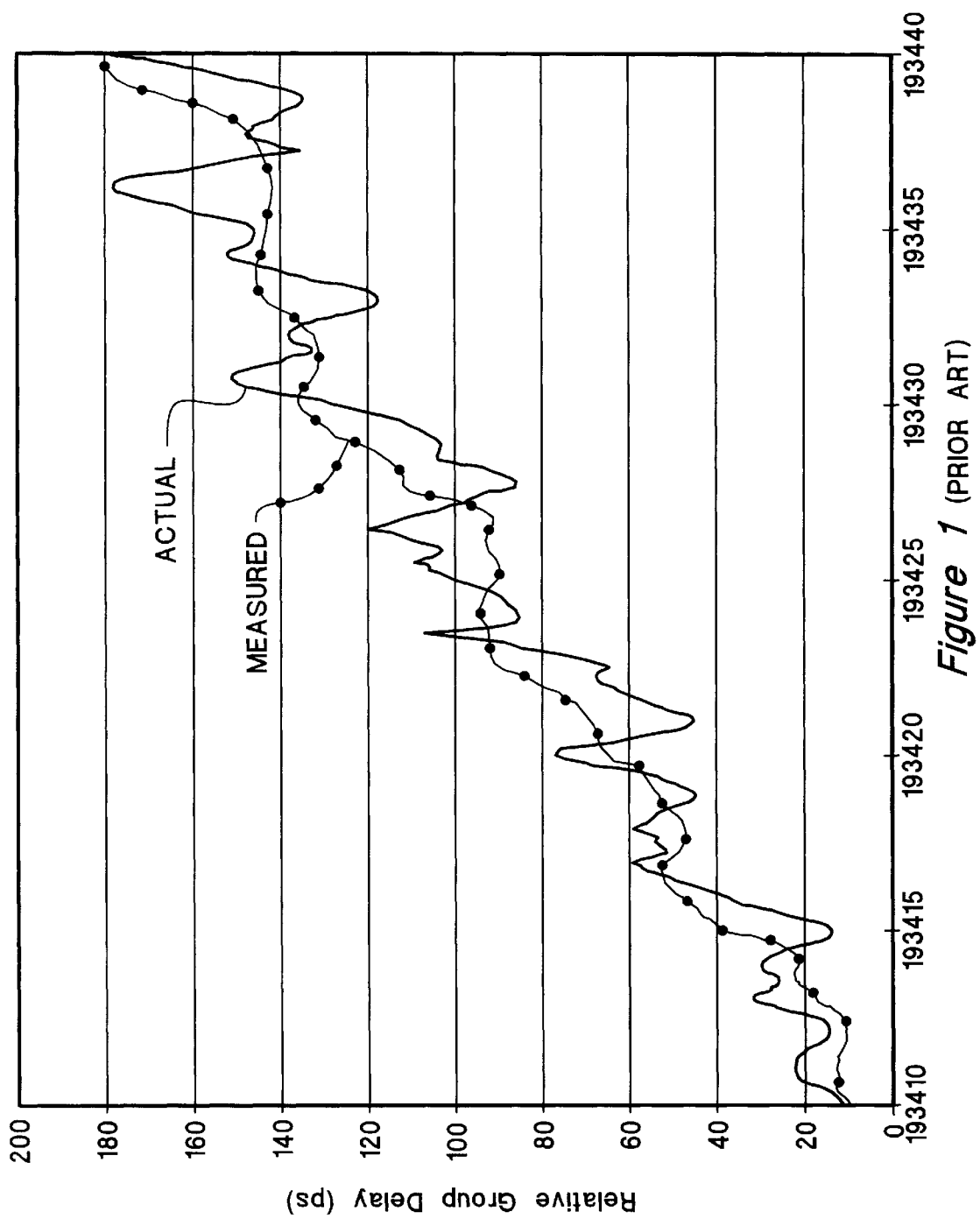
FIG. 1 shows a relative group delay measurement of an optical component using a prior art measurement method.

FIG. 1 shows a relative group delay measurement of an optical component using a prior art measurement method. The measured relative group delay is compared to the actual group delay of the optical component. The prior art measurement method phase compares an amplitude modulated optical carrier with that of a phase reference signal. The phase comparison, performed at various optical carrier frequencies, indicates changes in relative group delay according to changes in optical frequency. However, frequency resolution is limited in this measurement method because the measured relative group delay is a function of the delays at the optical frequencies of a lower modulation sideband and an upper modulation sideband resulting from the amplitude modulation of the optical carrier. Because the modulation sidebands are spaced far apart in frequency to achieve sufficiently high timing resolution, relative group delay variations that are near or within the frequency spacing of the a modulation sidebands are smoothed out, causing the prior art measurement method to mask the actual dispersion characteristics of the optical component.

Dispersive characteristics of an optical component are manifest as phase indices of refraction that are dependent on optical frequency. In the preferred embodiments of the present invention, phase terms and phase indices of refraction at discrete optical frequencies are extracted from modulation phase shift measurements performed on a series of modulated optical carriers in which reference modulation sidebands are designated. The phase terms indicate changes in group delay at each of the discrete optical frequencies. Within the phase terms, phase indices of refraction are isolated and used to calculate relative group delay and chromatic dispersion, providing measures of the dispersive characteristics of the optical component.

Figure 2A:
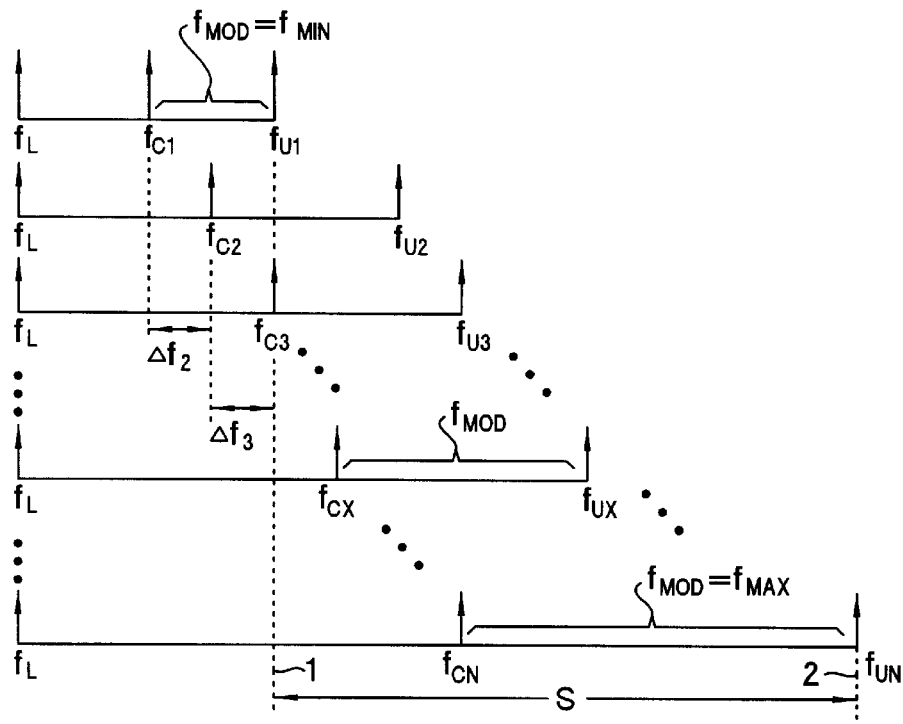
FIGS. 2a–2c illustrate series of modulated optical carriers included in the chromatic dispersion measurement scheme constructed according to a first preferred embodiment of the present invention.
Figure 2B:
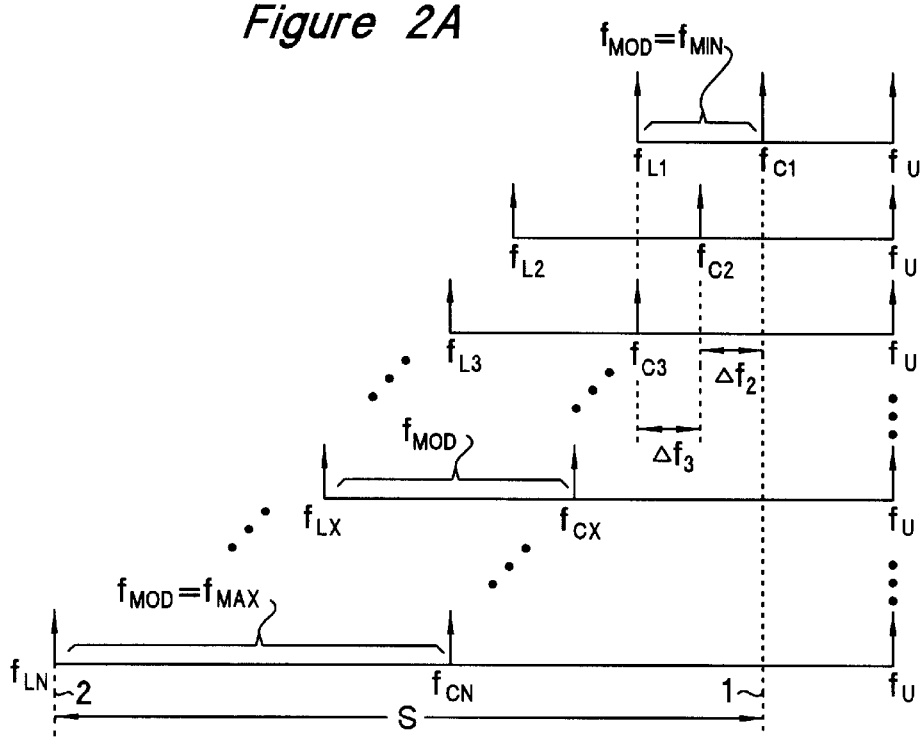
Figure 2C:
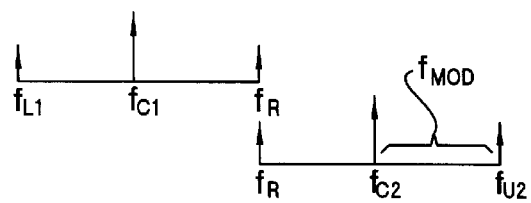

FIGS. 2a–2c illustrate three alternative series of modulated optical carriers included in the chromatic dispersion measurement scheme constructed according to a first preferred embodiment of the present invention. In FIG. 2a, a reference modulation sideband at optical frequency $f_L$ is established by a lower modulation sideband of each of the modulated optical carriers at optical carrier frequencies $f_{C1}$–$f_{CN}$. Although modulation phase shift measurements can be performed on as few as two modulated optical carriers in the first preferred embodiment, typically, the measurements are performed on a series of modulated optical carriers as shown. In each instance (indexed by the positive integer subscript X) the modulated optical carrier includes an optical signal at the frequency $f_{CX}$ of the optical carrier, an upper modulation sideband at frequency $f_{UX}$ and a lower modulation sideband at frequency $f_L$. However, other modulation sidebands may be present based on the type of modulation, distortion, or whether the intensity or field of the optical carrier is modulated. The frequency $f_{UX}$ of the upper modulation sideband and the frequency $f_L$ of the lower modulation sideband are each offset from the frequency $f_{CX}$ of the optical carrier by the adjustable modulation frequency $f_{MOD}$. Each modulation phase shift measurement, performed on a corresponding modulated optical carrier, phase compares the corresponding modulated optical carrier to a phase reference signal having a frequency equal to the modulation frequency $f_{MOD}$ of the modulated optical carrier. In each instance the phase comparison results in a measurement $M_X$ which is a function of the phase indices $n_L$ and $n_{UX}$, where the phase index $n_L$ corresponds to the phase index of refraction at the frequency $f_L$ of the lower modulation sideband and the phase index $n_{UX}$ is the phase index of refraction at the frequency $f_{UX}$ of the upper modulation sideband. Each measurement $M_X$ and the phase indices at the frequencies of the modulation sidebands is depicted in equation 1.

$$M_X = (n_{UX}^2 \pi f_{UX} - n_L^2 \pi f_L)z/2C = \phi_{UX} - \phi_{REF} \quad (1)$$

where $f_{UX}$ is the frequency of the optical carrier $f_{CX}$ plus the modulation frequency $f_{MOD}$, $f_L$ is the frequency of the optical carrier $f_{CX}$ minus the modulation frequency $f_{MOD}$, C is the speed of light in a vacuum and z is physical propagation length of the optical component through which the modulated optical carriers propagate. Each measurement $M_X$ is alternatively expressed as a difference between an unknown phase term $\phi_{UX}$ and a reference phase term $\phi_{REF}$.

In FIG. 2a, a first optical carrier having frequency $f_{C1}$ is modulated to produce a lower modulation sideband at optical frequency $f_L$ and an upper modulation sideband at frequency $f_{U1}$. The modulation frequency is set to a minimum frequency $f_{MIN}$ which is the lowest modulation frequency $F_{MOD}$ that is still sufficiently high to assure that a designated timing resolution is achieved in the group delay and chromatic dispersion characterizations. In a typical modulation phase shift measurement performed at an optical frequency of 194,000 GHz and having a phase resolution of 0.1 degree, a modulation frequency of 1.0 GHz yields a timing resolution of approximately 1/3600 nanoseconds, or 0.3 picoseconds whereas a modulation frequency of 100 MHZ yields a timing resolution of only 3.0 picoseconds. In this example $f_{MIN}$ is equal to 1.0 GHz. The modulation frequency $F_{MOD}$ and the optical carrier frequency $f_{C1}$ are chosen so that the upper modulation sideband at frequency $f_{U1}$ coincides with a first endpoint 1 of the frequency segment S over which the effective indices of refraction are extracted.

A modulation phase shift measurement is performed on the modulated optical carrier having optical carrier frequency $f_{C1}$. The modulation phase shift measurement results in a measurement $M_1$ that is a function of the phase indices $n_L$ and $n_{U1}$ at optical frequencies $f_L$ and $f_{U1}$, respectively. In particular, $M_1 = (n_{U1}^2 \pi f_{U1} - n_L^2 \pi f_L)z/2C = \phi_{U1} - \phi_{REF}$.

A second optical carrier at optical frequency $f_{C2}$ is modulated to produce a lower modulation sideband at frequency $f_L$. In order to maintain the frequency of the lower modulation sidebands at frequency $f_L$, the frequency increment $\Delta f_2$ in the modulation frequency $f_{MOD}$ equals the frequency increment or step size $\Delta f_2$ in the frequency of the optical carrier corresponding to the step in optical carrier frequency from $f_{C1}$ to optical carrier frequency $f_{C2}$. A modulation phase shift measurement is performed on the modulated optical carrier having optical carrier frequency $f_{C2}$. The modulation phase shift measurement results in a measurement $M_2$ that is a function of the phase indices $n_L$ and $n_{U2}$ at frequencies $f_L$ and $f_{U2}$, respectively. In particular, $M_2 = (n_{U2}^2 \pi f_{U2} - n_L^2 \pi f_L)z/2C = \phi_{U2} - \phi_{REF}$.

A third optical carrier having frequency $f_{C3}$ is modulated to produce a lower modulation sideband at frequency $f_L$. In order to maintain the frequency of the lower modulation sidebands at frequency $f_L$, the frequency of the optical carrier and the modulation frequency are each adjusted by a frequency increment $\Delta f_3$. A modulation phase shift measurement is performed on the modulated optical carrier having optical carrier frequency $f_{C3}$. The modulation phase shift measurement results in a measurement $M_3$ that is a function of the phase indices $n_L$ and $n_{U3}$ at frequencies $f_L$ and $f_{U3}$, respectively. In particular, $M_3 = (n_{U3}^2 \pi f_{U2} - n_L^2 \pi f_L)z/2C = \phi_{U3} - \phi_{REF}$.

The sequence of stepping the optical carrier frequency $f_{CX}$ and modulation frequency $f_{MOD}$ while maintaining a lower modulation sideband at frequency $f_L$ is continued until a maximum modulation frequency $f_{MAX}$ is reached, resulting in a modulated optical carrier having optical carrier frequency $f_{CN}$. The maximum modulation frequency is established by phase resolution limitations of the modulation phase shift measurement system, noise performance or other system parameters or is otherwise designated. In this example $f_{MAX}$ is chosen to be 2.7 GHz. A modulation phase shift measurement is performed on the modulated optical carrier having optical carrier frequency $f_{CN}$. The modulation phase shift measurement results in a measurement $M_N$ that is a function of the phase indices $n_L$ and $n_{UN}$ at frequencies $f_L$ and $f_{UN}$, respectively. In particular, $M_N=(n_{UN}2\ \pi f_{UN}-n_L2\ \pi f_L)z/2C=\phi_{UN}-\phi_{REF}$.

Each of the modulation phase shift measurements $M_1-M_N$ that correspond to the modulated optical carriers having optical carrier frequencies $f_{C1}-f_{CN}$ can be expressed in terms of an unknown phase term $\phi_{UX}$ and a reference phase term $\phi_{REF}$. In each measurement, the reference phase term $\phi_{REF}$, equal to $n_L2\ \pi f_L z/2C$, is established by the lower modulation sideband at frequency $f_L$. The value of this reference phase term $\phi_{REF}$ in this example is set to a designated value based on an estimate of the physical length z and an estimate of the phase index of refraction $n_L$. The resulting unknown phase terms $\phi_{UX}$ in each modulation phase shift measurement indicate changes in group delay at each of the discrete optical frequencies $f_{UX}$. The unknown phase term $\phi_{UX}$ is also a function of the phase index of refraction $n_{UX}$ at the upper sideband frequency which can be extracted from the corresponding modulation phase shift measurements and the designated value of the reference phase term $\phi_{REF}$. Each of the extracted phase indices $n_{U1}-n_{UN}$ represent actual phase indices of refraction to the extent that phase index $n_L$ and the propagation length z are precisely determined. Since the phase index $n_L$ and the physical propagation length z are estimated in this example, the extracted phase indices of refraction $n_{U1}-n_{UN}$ each deviate from the actual phase indices of refraction by a constant. However, this deviation is immaterial in calculations of relative group delay in which an arbitrary offset can be applied to absorb the deviation, or in calculations of chromatic dispersion which rely on second derivatives of the phase indices of refraction with respect to frequency.

The extracted phase indices of refraction $n_{U1}-n_{UN}$ at the discrete optical frequencies $f_{U1}-f_{UN}$ are used to calculate the relative group delay of the optical component as a function of optical frequency f. The relative group delay at a given optical frequency f is calculated according to equation 2.

$$G(f)=(n_f+f\ dn_f/df)z/C+\text{constant} \quad (2).$$

In this example, the derivative $dn_f/df$ is computed numerically based on nearby phase indices or by taking the derivative of a function that is curve-fitted to the phase indices at discrete optical frequencies.

Chromatic dispersion D at a given optical frequency f is calculated according to the equation 3.

$$D(f)=f^3/C^2 d^2 n_f/df^2 \quad (3).$$

The relative group delay G(f) and the chromatic dispersion D(f) of the optical component within the frequency segment S are calculated based on the phase indices $n_{U1}-n_{UN}$ at the frequencies $f_{U1}-f_{UN}$. In this series of modulated optical carriers, the frequency segment S is defined by the minimum modulation frequency $f_{MIN}$ and maximum modulation frequency $f_{MAX}$.

In FIG. 2b, the reference modulation sideband at frequency $f_U$ is established by an upper modulation sideband of each of the modulated optical carriers at optical carrier frequencies $f_{C1}-f_{CN}$. Although modulation phase shift measurements can be performed on as few as two modulated optical carriers in the first preferred embodiment, typically the measurements are performed on a series of modulated optical carriers as shown. The series of modulated optical carriers shown in FIG. 2b and the corresponding modulation phase shift measurements are performed in a similar fashion to those of FIG. 2a, except that in FIG. 2b, the upper modulation sidebands of the modulated optical carriers establish the reference modulation sideband. In each instance in FIG. 2b the modulated optical carrier includes an optical signal at the frequency $f_{CX}$ of the optical carrier, an upper modulation sideband at frequency $f_U$ and a lower modulation sideband at frequency $f_{LX}$, although other modulation sidebands may be present. The frequency $f_U$ of the upper modulation sideband and the frequency $f_{LX}$ of the lower modulation sideband are each offset from the frequency $f_{CX}$ of the optical carrier by the adjustable modulation frequency $f_{MOD}$ of the modulated optical carrier. Each modulation phase shift measurement, performed on each modulated optical carrier, phase compares the corresponding modulated optical carrier to a phase reference signal having a frequency equal to the modulation frequency $f_{MOD}$. In each instance the phase comparison results in a measurement $M_X$ which is a function of the phase indices $n_{LX}$ and $n_U$, where the phase index $n_U$ corresponds to the phase index of refraction at the frequency $f_U$ of the upper modulation sideband and the phase index $n_{LX}$ is the phase index of refraction at the frequency $f_{LX}$ of the lower modulation sideband. Once phase differences between the optical carriers are accounted for, the relationship between each measurement $M_X$ and the phase indices at the frequencies of the modulated sidebands is depicted in equation 4.

$$M_X=(n_U2\ \pi f_U-n_{LX}2\ \pi f_{LX})z/2C=\phi_{REF}-\phi_{LX} \quad (4)$$

where $f_{LX}$ is the frequency of the optical carrier $f_{CX}$ minus the modulation frequency $f_{MOD}$, $f_U$ is the frequency of the optical carrier $f_{CX}$ plus the modulation frequency $f_{MOD}$, C is the speed of light in a vacuum and z is physical propagation length of the optical component through which the modulated optical carriers propagate. Each measurement $M_X$ is alternatively expressed as a difference between an unknown phase term $\phi_{LX}$ and a reference phase term $\phi_{REF}$.

In FIG. 2b, a first optical carrier having frequency $f_{C1}$ is modulated to produce a lower modulation sideband at optical frequency $f_{LX}$ and an upper modulation sideband at frequency $f_U$. The modulation frequency is set to a minimum frequency $f_{MIN}$ which in this example is equal to 1.0 GHz. The modulation frequency $f_{MOD}$ and the optical carrier frequency $f_{C1}$ are chosen so that the lower modulation sideband at frequency $f_{L1}$ coincides with a first endpoint 1 of the frequency segment S over which the effective indices of refraction are extracted.

A modulation phase shift measurement is performed on the modulated optical carrier having optical carrier frequency $f_{C1}$. The modulation phase shift measurement results in a measurement $M_1$ that is a function of the phase indices $n_{L1}$ and $n_U$ at optical frequencies $f_{L1}$ and $f_U$, respectively. In particular, $M_1=(n_U2\ \pi f_U-n_{L1}2\ \pi f^{L1})z/2C=\phi_{REF}-\phi_{L1}$.

A second optical carrier at optical frequency $f_{C2}$ is modulated to produce an upper modulation sideband at frequency $f_U$. In order to maintain the frequency of the upper modulation sidebands at frequency $f_U$, the frequency increment or step size $\Delta f_2$ in the modulation frequency $f_{MOD}$ equals the frequency increment $\Delta f_2$ in the frequency of the optical carrier corresponding to the step in optical carrier frequency between frequency $f_{C1}$ and frequency $f_{C2}$. A modulation phase shift measurement is performed on the modulated optical carrier having optical carrier frequency $f_{C2}$. The modulation phase shift measurement results in a measurement $M_2$ that is a function of the phase indices $n_{L2}$ and $n_U$ at frequencies $f_{L2}$ and $f_U$, respectively. In particular, $M_2=(n_U2\ \pi f_U-n_{L2}2\ \pi f_{L2})z/2C=\phi_{REF}-\phi_{L2}$.

A third optical carrier having frequency $f_{C3}$ is modulated to produce a upper modulation sideband at frequency $f_U$. In order to maintain the frequency of the upper modulation sidebands at frequency $f_U$, the frequency of the optical carrier and the modulation frequency are each changed by a frequency step size $\Delta f_3$. A modulation phase shift measurement is performed on the modulated optical carrier having optical carrier frequency $f_{C3}$. The modulation phase shift measurement results in a measurement $M_3$ that is a function of the phase indices $n_{L3}$ and $n_U$ at frequencies $f_{L3}$ and $f_U$, respectively. In particular, $M_3=(n_U 2\pi f_U - n_{L3} 2\pi f_{L3})z/2C = \phi_{REF}-\phi_{L3}$.

The sequence of stepping the optical carrier frequency $f_{CX}$ and modulation frequency $f_{MOD}$ while maintaining an upper modulation sideband at frequency $f_U$ is continued until a maximum modulation frequency $f_{MAX}$ is reached, resulting in a modulated optical carrier having optical carrier frequency $f_{CN}$. The maximum modulation frequency is chosen to be 2.7 GHz. A modulation phase shift measurement is performed on the modulated optical carrier having optical carrier frequency $f_{CN}$. The modulation phase shift measurement results in a measurement $M_N$ that is a function of the phase indices $n_{LN}$ and $n_U$ at frequencies $f_{LN}$ and $f_U$, respectively. In particular, $M_N=(n_U 2\pi f_U - n_{LN} 2\pi f_{LN})z/2C = \phi_{REF}-\phi_{LN}$.

Each of the modulation phase shift measurements $M_1$–$M_N$ is expressed in terms of an unknown phase term $\phi_{LX}$ and a reference phase term $\phi_{REF}$. In each measurement, the reference phase term $\phi_{REF}$, equal to $n_U 2\pi f_U z/2C$, is established by the upper modulation sideband at frequency $f_U$. The value of this reference phase term $\phi_{REF}$ in this example is set to a designated value based on an estimate of the physical length z and an estimate of the phase index of refraction $n_U$. The resulting unknown phase terms $\phi_{UX}$ in each modulation phase shift measurement indicate changes in group delay at each of the discrete optical frequencies $f_{UX}$. The unknown phase term $\phi_{LX}$ in each modulation phase shift measurement is also a function of the phase index of refraction at the lower modulation sideband frequency which can be extracted from the corresponding modulation phase shift measurements and the designated value of the reference phase term $\phi_{REF}$. Each of the extracted phase indices $n_{L1}$–$n_{LN}$ represent actual phase indices of refraction to the extent that phase index $n_U$ and the propagation length z are precisely determined. Otherwise, the extracted phase indices differ from the actual phase indices by a constant term which becomes immaterial in the calculations of relative group delay GD(f) and chromatic dispersion D(f).

The extracted phase indices of refraction $n_L$–$n_{LN}$ at the discrete optical frequencies $f_{L1}$–$f_{LN}$ are used in equation 2 to calculate the relative group delay GD(f) of the optical component as a function of optical frequency. The extracted phase indices of refraction $n_{L1}$–$n_{LN}$ at the discrete optical frequencies $f_{L1}$–$f_{LN}$ are used in equation 3 to calculate the chromatic dispersion D(f) of the optical component as a function of optical frequency.

In FIG. 2c, the reference modulation sideband is established by an upper modulation sideband of a first modulated optical carrier and a lower modulation sideband of a second modulated optical carrier. The first modulated optical carrier includes an optical signal at an optical carrier frequency $f_{C1}$, an upper modulation sideband at a frequency $f_R$ and a lower modulation sideband at frequency $f_{L1}$ although other modulation sidebands may be present. The frequency $f_R$ of the upper modulation sideband and the frequency $f_{L1}$ of the lower modulation sideband are each offset from the frequency $f_{C1}$ of the optical carrier by the adjustable modulation frequency $f_{MOD}$. The second modulated optical carrier includes an optical signal at an optical carrier frequency $f_{C2}$, an upper modulation sideband at a frequency $f_{U2}$ and a lower modulation sideband at frequency $f_R$ although other modulation sidebands may be present. The optical carrier frequency $f_{C2}$ and the modulation frequency of the second modulated optical carrier are adjusted so that the lower modulation sideband is coincident with the frequency $f_R$ of the upper modulation sideband of the first modulated optical carrier. In each instance the modulation frequency $f_{MOD}$ is between $f_{MIN}$ and $f_{MAX}$. Modulation phase shift measurements are performed on each of the modulated optical carriers. A first modulation phase shift measurement $M_1$, performed on the first modulated optical carrier is a function of the phase indices $n_R$ and $n_{L1}$, where the phase index $n_R$ corresponds to the phase index of refraction at the frequency $f_R$ of the reference sideband and the phase index $n_{L1}$ is the phase index of refraction at the frequency $f_{L1}$. In particular, $M1=(n_R 2\pi f_R - n_{L1} 2\pi f_{L1})z/2C = \phi_{REF}-\phi_{L1}$. A second modulation phase shift measurement $M_2$, performed on the second modulated optical carrier is a function of the phase indices $n_R$ and $n_{U1}$, where the phase index $n_R$ is the phase index of refraction at the frequency $f_R$ of the reference sideband and the phase index $n_{U2}$ is the phase index of refraction at the frequency $f_{U2}$. In particular, $M_2=(n_{U2} 2\pi f_{U2} - n_R 2\pi f_R)z/2C = \phi_{U2}-\phi_{REF}$.

The modulation phase shift measurements $M_1$, $M_2$ are expressed in terms of an unknown phase terms $\phi_{L1}$, $\phi_{U2}$ and a reference phase term $\phi_{REF}$ equal to $n_R 2\pi f_R z/2C$, established by an upper and lower modulation sideband at frequency $f_R$. The value of this reference phase term $\phi_{REF}$ is set to a designated value based on an estimate of the physical length z and an estimate of the phase index of refraction $n_U$, or alternatively, is based on previous designations or measurements of phase index $n_U$ and physical length z. The resulting unknown phase terms $\phi_{L1}$, $\phi_{U2}$ in the first modulation phase shift measurement and the second modulation phase shift measurement indicate changes in group delay between optical frequencies $f_{L1}$ and $f_{U2}$. The unknown phase term $\phi_{L1}$ in the first modulation phase shift measurement is a function of the phase index of refraction $n_{L1}$ at the lower modulation sideband frequency $f_{L1}$ which can be extracted from the first modulation phase shift measurements and the designated value of the reference phase term $\phi_{REF}$. The resulting unknown phase term $\phi_{U2}$ in the second modulation phase shift measurement is a function of the phase index of refraction $n_{U2}$ at the upper modulation sideband frequency $f_{U2}$ which can be extracted from the second modulation phase shift measurement and the designated value of the reference phase term $\phi_{REF}$. Each of the extracted phase indices $n_{L1}$, $n_{U2}$ represent actual phase indices of refraction to the extent that phase index $n_R$ and the propagation length z are precisely determined. Otherwise, the extracted phase indices differ from the actual phase indices by a constant term which becomes immaterial in the calculations of relative group delay GD(f) and chromatic dispersion D(f) according to equations 2 and 3, respectively.

Although two modulated optical carriers are shown in FIG. 2c, modulation phase shift measurements can be performed on a series of modulated optical carriers where each modulated optical carrier in the series has a modulation sideband that coincides with the frequency of the modulation sideband of another modulated optical carrier. Each modulation phase shift measurement phase compares the corresponding modulated optical carrier to a phase reference signal having a frequency equal to the modulation frequency $f_{MOD}$ which is adjusted between a minimum modulation frequency $f_{MIN}$ and a maximum modulation frequency $f_{MAX}$. The extracted phase indices of refraction at discrete optical frequencies within a frequency segment S defined by the minimum and maximum modulation frequencies are used in equation 2 to calculate the relative group delay GD(f) of the optical component as a function of optical frequency and are used in equation 3 to calculate the chromatic dispersion D(f) of the optical component as a function of optical frequency. Alternatively, the phase terms resulting from the modulation phase shift measurements are used to indicate changes in group delay at the frequencies of the non-coinciding modulation sidebands.

FIGS. 2a–2c show alternative series of modulated optical carriers upon which modulation phase shift measurements are performed to extract phase indices of refraction at discrete optical frequencies within a frequency segment defined by minimum and maximum modulation frequencies. While the modulated optical carriers included the first preferred embodiment of the present invention shown in FIGS. 2a–2c involve sequential steps in the optical carrier frequency and modulation frequency of the modulated optical carriers to cover the frequency segment S, the modulated optical carriers and the corresponding modulation phase shift measurements can be acquired independent of a specified sequence. For example, the modulation frequencies and optical carrier frequencies can be adjusted in a swept or a stepped manner, and, in an order that is based on convenience or measurement efficiency.

Figure 3:
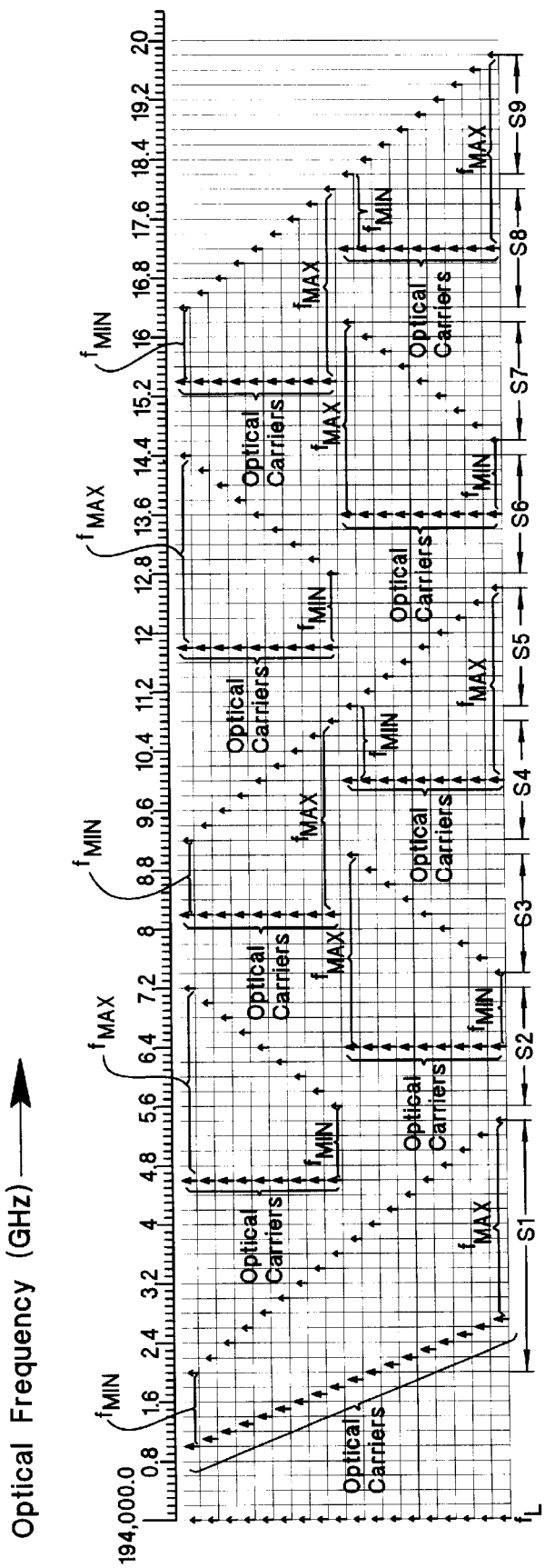
FIG. 3 shows an arrangement of modulated optical carriers included in a second preferred embodiment of the present invention.

According to a second preferred embodiment of the present invention modulated optical carriers are arranged to enable phase indices of refraction to be extracted at discrete optical frequencies over a frequency range spanning multiple frequency segments. FIG. 3 shows an arrangement of modulated optical carriers upon which corresponding modulation phase shift measurements are performed to extract the phase indices of refraction. In this example, the phase indices are extracted over the 194,002.0 GHz to 194,020.0 GHz frequency range in 200 MHZ frequency step although other frequency ranges and step sizes can be designated through adjustment of the optical carrier frequencies and modulation frequencies.

In FIG. 3, an optical carrier frequency is set to 194,001.0 GHz and the modulation frequency is set to a minimum value of 1 GHz. Then, the optical carrier frequency and the modulation frequency are each increased by 100 MHZ until the maximum modulation frequency of 2.7 GHz is reached. At each 100 MHZ step, a lower modulation sideband at 194,000.0 GHz is maintained and a modulation phase shift measurement is performed. Each modulation phase shift measurement is governed by equation 1 and enables phase terms and phase indices of refraction to be extracted at each of the frequencies of the upper modulation sideband. The extracted phase terms and phase indices are within the segment S1, spanning the frequency range from 194,002.0 to 194,005.4 GHz and are spaced every 200 MHZ. Relative group delay GD(f) and chromatic dispersion D(f) are calculated from the phase indices according to equations 2 and 3, respectively.

The optical carrier is then set to 194,004.6 GHz and the modulation frequency is stepped between a minimum modulation frequency of 1.0 GHz and a maximum modulation frequency of 2.6 GHz in 200 MHZ increments. The lower modulation sidebands of this modulated optical carrier fall within frequency segment S1 and overlap, or coincide, with the frequencies of the upper modulation sidebands of the previously measured modulated optical carriers, consistent with the modulated optical carriers as shown in FIG. 2c.

Extracted phase indices of refraction within segment S1 provide reference phase terms for modulation phase shift measurements performed on the modulated optical carrier at frequency 194,004.6 GHz as the modulation frequency is stepped between 1.0 GHz and 2.6 GHz. Each modulation phase shift measurement and the corresponding reference phase term enable phase indices of refraction to be extracted in a frequency segment S2, spanning between 194,005.6 GHz and 194,007.2 GHz spaced at 200 MHZ frequency increments.

The optical carrier is then set to 194,006.4 GHz and the modulation frequency is stepped between a minimum modulation frequency of 1.0 GHz and a maximum frequency of 2.6 GHz in 200 MHZ increments. The lower modulation sidebands of this modulated optical carrier that are within frequency segment S1 overlap, or coincide, with the frequency of the upper modulation sidebands of the previously measured modulated optical carriers within frequency segment S1, also consistent with the modulated optical carriers as shown in FIG. 2c. Extracted phase indices of refraction within segment S1 also provide reference phase terms for modulation phase shift measurements performed on the modulated optical carrier at optical carrier frequency 194,006.4 GHz as the modulation frequency is stepped between 1.0 GHz and 2.6 GHz. Each modulation phase shift measurement and the corresponding reference phase term enable phase indices of refraction to be extracted in a frequency segment S3, spanning between 194,007.4 GHz and 194,009.0 GHz spaced at 200 MHZ frequency increments.

The optical carrier is then set to 194,008.2 GHz and the modulation frequency is stepped between a minimum of 1.0 GHz and 2.6 GHz in 200 MHZ increments. The lower modulation sidebands of the modulated optical carrier at 194,008.2 GHz overlap, or coincide with the upper sideband of the previous modulation phase shift measurements where the modulated optical carrier was set to 194,006.4 GHz. The previously extracted phase indices in the frequency segment S2 provide reference phase terms for the current measurements, enabling phase indices of refraction to be extracted in a frequency segment S4, spanning between 194,009.2 GHz and 194,010.8 GHz spaced at 200 MHZ frequency increments.

In a likewise fashion, the optical carriers are stepped and the modulation frequency is adjusted to cover additional frequency segments S5–S9. Corresponding modulation phase measurements are performed on each of the modulated optical carriers. In each of the modulation phase shift measurements the lower modulation sideband of the modulated optical carrier overlaps, or coincides with a frequency of a modulation sideband at which the phase index has been extracted. The extracted phase indices provide reference phase terms for each of the later modulation phase shift measurements, enabling phase indices of refraction, relative group delay and chromatic dispersion to be determined in the additional frequency segments.

FIG. 3 illustrates one arrangement of modulated optical carriers upon which a sequence of modulation phase shift measurements are performed to extract phase indices of refraction and calculate relative group delay and chromatic dispersion over the frequency range from 194,002.0 GHz to 194,020.0 GHz in 200 MHZ frequency steps. Other combinations and sequences of modulation frequencies and optical carrier frequencies, each relying on a reference modulation sideband to establish a corresponding reference phase term, are alternatively used to cover a designated frequency range at a designated frequency step size. The optical frequency resolution of the resulting modulation phase shift measurements is determined by the frequency step size between the modulated optical carriers.

In each modulation phase shift measurement within the preferred embodiments of the present invention, unknown phase terms result. Phase indices within the phase terms are extracted for calculations of relative group delay and chromatic dispersion of an optical component. The phase terms indicate changes in group delay providing and also provide a measure of the dispersive characteristics of the optical component.

While stepped changes in optical carrier frequency and modulation frequency have been shown in the preferred embodiments of the present invention, phase terms and phase indices of refraction are alternatively extracted from a series of modulated optical carriers resulting from swept modulation phase shift measurements. In one example, modulation phase shift measurement data is acquired as the modulation frequency $f_{MOD}$ is stepped between the minimum modulation frequency $f_{MIN}$ and the maximum modulation frequency $f_{MAX}$ as the frequency of the optical carrier is swept over a designated range at each of the stepped modulation frequencies. From the measurement data resulting from the swept optical carriers, reference modulation sidebands are designated to establish reference phase terms. Phase terms and phase indices of refraction are then extracted from the modulation phase shift measurement data and the reference phase terms. In another example, modulation phase shift measurement data is acquired as the optical carrier frequency is stepped over a designated frequency range as the modulation frequency of the modulated optical carrier is swept between the minimum and maximum modulation frequencies. From the measurement data resulting from the swept modulation frequencies, reference modulation sidebands are designated to establish relative phase terms. Phase terms and phase indices of refraction are then extracted from the modulation phase shift measurement data and the phase reference terms.

The preferred embodiments of the present invention have been illustrated in detail. However, it should be apparent that modifications and adaptations to these embodiments may occur to one skilled in the art without departing from the scope of the present invention as set forth in the following claims.

What is claimed is:

1. A measurement scheme for isolating dispersive characteristics of an optical component at at least two discrete optical frequencies, comprising the steps of:

modulating a first optical carrier at a first modulation frequency to produce a first lower modulation sideband and a first upper modulation sideband;

performing a first modulation phase shift measurement on the modulated first optical carrier;

modulating a second optical carrier at a second modulation frequency to produce a second lower modulation sideband and a second upper modulation sideband, the frequency of one of the second lower modulation sideband and the second upper modulation sideband coinciding with the frequency of one of the first lower modulation sideband and the first upper modulation sideband;

performing a second modulation phase shift measurement on the modulated second optical carrier wherein the one of the second lower modulation sideband and the second upper modulation sideband coinciding in frequency with the one of the first lower modulation sideband and the first upper modulation sideband provides a reference phase term for the first modulation phase shift measurement and the second modulation phase shift measurement; and extracting a first phase term from the reference phase term and the first modulation phase shift measurement and a second phase term from the reference phase term and the second modulation phase shift measurement, the first phase term at the frequency of the first lower modulation sideband and the second phase term at the frequency of the second upper modulation sideband when the frequency of the first upper modulation sideband coincides with the frequency of the second lower modulation sideband, the first phase term at the frequency of the first lower modulation sideband and the second phase term at the frequency of the second lower modulation sideband when the frequency of the first upper modulation sideband coincides with the frequency of the second upper modulation sideband, the first phase term at the frequency of the first upper modulation sideband and the second phase term at the frequency of the second upper modulation sideband when the frequency of the first lower modulation sideband coincides with the frequency of the second lower modulation sideband.

2. The measurement scheme of claim 1 wherein the reference phase term is established according to a phase index of refraction at the frequency of the one of the second lower modulation sideband and the second upper modulation sideband coinciding with the frequency of one of the first lower modulation sideband and the first upper modulation sideband, and according to a physical propagation length of the optical component.

3. The measurement scheme of claim 1 wherein the step of performing a first modulation phase shift measurement includes phase comparing the modulated first optical carrier to a first phase reference signal having a frequency equal to the first modulation frequency and the step of performing a second modulation phase shift measurement includes phase comparing the modulated second optical carrier to a second phase reference signal having a frequency equal to the second modulation frequency.

4. The measurement scheme of claim 1 further comprising the step of modulating at least one additional optical carrier to produce at least one modulation sideband at a frequency coincident with the frequency of one of the first lower modulation sideband, the first upper modulation sideband, the second lower modulation sideband and the second upper modulation sideband and to produce at least one modulation sideband at a frequency noncoincident with the frequency of the first lower modulation sideband, the first upper modulation sideband, the second lower modulation sideband and the second upper modulation sideband, the step of performing a corresponding modulation phase shift measurement on the at least one additional modulated optical carrier, and the step of extracting corresponding phase terms at the frequency of the at least one modulation sideband at the frequency noncoincident with the frequency of the first lower modulation sideband, the first upper modulation sideband, the second lower modulation sideband and the second upper modulation sideband.

5. The measurement scheme of claim 4 further comprising the step of calculating relative group delay from a first phase index of refraction within the first phase term, a second phase index of refraction within the second phase term and corresponding phase indices of refraction within the corresponding phase terms.

6. The measurement scheme of claim 4 further comprising the step of calculating chromatic dispersion from a first phase index of refraction within the first phase term, a second phase index of refraction within the second phase term and corresponding phase indices of refraction within the corresponding phase terms.

7. The measurement scheme of claim 1 wherein the first optical carrier and the second optical carrier are offset in frequency by the difference between the first modulation frequency and the second modulation frequency.

8. The measurement scheme of claim 4 wherein the first optical carrier and the second optical carrier are offset in frequency by the difference between the first modulation frequency and the second modulation frequency.

9. A measurement scheme for isolating dispersive characteristics of an optical component at predefined frequencies within a predetermined frequency segment, comprising the steps of:

modulating a first optical carrier having a first frequency at a first modulation frequency to produce a modulation sideband at a reference frequency and a modulation sideband coinciding with a first endpoint of the predetermined frequency segment;

performing a first modulation phase shift measurement on the modulated first optical carrier;

modulating a second optical carrier having a second frequency at a second modulation frequency to produce a modulation sideband at the reference frequency and a modulation sideband coinciding with a second endpoint of the predetermined frequency segment;

performing a second modulation phase shift measurement on the modulated second optical carrier;

performing a sequence of modulation phase shift measurements on a series of modulated optical carriers, each modulated optical carrier in the series having a first modulation sideband at the reference frequency and a second modulation sideband coincident with a unique one of the predefined frequencies within the predetermined frequency segment, the sequence of modulation phase shift measurements including a modulation phase shift measurement on each of the modulated optical carriers in the series, wherein the first modulation sidebands at the reference frequency provide a reference phase term within each of the first modulation phase shift measurement, the second modulation phase shift measurement and the sequence of modulation phase shift measurements;

extracting a first phase term at the first endpoint from the first modulation phase shift measurement and the reference phase term;

extracting a second phase term at the second endpoint from the second modulation phase shift measurement and the reference phase term; and extracting a series of phase terms corresponding to each of the predefined frequencies within the predetermined frequency segment from the sequence of modulation phase shift measurements and the reference phase term.

10. The measurement scheme of claim 9 wherein the step of performing a first modulation phase shift measurement includes phase comparing the modulated first optical carrier to a first phase reference signal having a frequency equal to the first modulation frequency, the step of performing a second modulation phase shift measurement includes phase comparing the modulated second optical carrier to a second phase reference signal having a frequency equal to the second modulation frequency, and the step of performing a sequence of modulation phase shift measurements includes phase comparing each modulated optical carrier in the series of modulated optical carriers with a corresponding phase reference signal.

11. The measurement scheme of claim 9 wherein the reference phase term is established according to a phase index of refraction at the reference frequency and a physical propagation length of the optical component.

12. The measurement scheme of claim 9 further comprising the step of calculating relative group delay from a first phase index of refraction within the first phase term, a second phase index of refraction within the second phase term and a series of phase indices of refraction within the series of phase terms.

13. The measurement scheme of claim 9 further comprising the step of calculating chromatic dispersion from a first phase index of refraction within the first phase term, a second phase index of refraction within the second phase term and a series of phase indices of refraction within the series of phase terms.

14. The measurement scheme of claim 9 wherein the predefined frequencies within the predetermined frequency segment have a uniform frequency spacing equal to twice the frequency spacing between the modulated optical carriers in the series of modulated optical carriers.

15. The measurement scheme of claim 14 wherein the series of modulated optical carriers and the first modulation sidebands at the reference frequency and the second modulation sidebands are formed by stepping the frequency of the modulated optical carriers from the first frequency to the second frequency and by stepping the modulation frequency of the modulated optical carriers from the first modulation frequency to the second modulation frequency by equal frequency steps.

16. A measurement scheme for isolating dispersive characteristics of an optical component at discrete optical frequencies, comprising the steps of:

modulating a first optical carrier having a first frequency at a first modulation frequency to produce a modulation sideband at a reference frequency and a modulation sideband coinciding with a first endpoint of a first frequency segment;

performing a first modulation phase shift measurement on the modulated first optical carrier, the modulation sideband at the reference frequency providing a reference phase term;

modulating a second optical carrier having a second frequency at a second modulation frequency to produce a modulation sideband at the reference frequency and a modulation sideband coinciding with a second endpoint of the first frequency segment;

performing a second modulation phase shift measurement on the modulated second optical carrier;

modulating a first series of optical carriers each having frequency between the first frequency and the second frequency and each having a first modulation sideband at the reference frequency and a second modulation sideband coincident with a unique one of the predefined frequencies within the first frequency segment;

performing a first series of modulation phase shift measurements on the modulated first series of optical carriers, each modulation phase shift measurement in the first series of modulation phase shift measurements performed on a corresponding modulated optical carrier in the first series of modulated optical carriers;

modulating a third optical carrier at a series of modulation frequency each modulation frequency between the first modulation frequency and the second modulation frequency to produce a series of first modulation sidebands each coincident with a unique one of the predefined frequencies within the first frequency segment and a series of second modulation sidebands within a second frequency segment;

performing a second series of modulation phase shift measurements on the modulated third optical carrier, each modulation phase shift measurement in the second series of modulation phase shift measurements performed on the third optical carrier at a corresponding one of the series of modulation frequencies;

extracting a first phase term at the first endpoint from the first modulation phase shift measurement and the reference phase term;

extracting a second phase term at the second endpoint from the second modulation phase shift measurement and the reference phase term; and extracting a first series of phase terms corresponding to each of the predefined frequencies within the first frequency segment from the sequence of modulation phase shift measurements; and extracting a second series of phase terms at a series of frequencies corresponding to the frequencies of the series of the second modulation sidebands within the second frequency segment from the second series of modulation phase shift measurements.

17. The measurement scheme of claim 16 wherein the reference phase term is established according to a phase index of refraction at the reference frequency and a physical propagation length of the optical component.

18. The measurement scheme of claim 16 wherein the first series of modulated optical carriers and the first modulation sidebands at the reference frequency and the second modulation sidebands are formed by stepping the frequency of the modulated optical carriers from the first frequency to the second frequency and by stepping the modulation frequency of the modulated optical carriers from the first modulation frequency to the second modulation frequency by equal frequency steps.

19. The measurement scheme of claim 16 further comprising the step of calculating relative group delay from a first phase index of refraction within the extracted first phase term, a second phase index of refraction within the extracted second phase term, a first series of phase indices of refraction within the extracted first series of phase terms, and a second series of phase indices of refraction within the extracted second series of phase terms.

20. The measurement scheme of claim 16 further comprising the step of calculating chromatic dispersion from a first phase index of refraction within the extracted first phase term, a second phase index of refraction within the extracted second phase term, a first series of phase indices of refraction within the extracted first series of phase terms, and a second series of phase indices of refraction within the extracted second series of phase terms.

* * * * *